US00RE38003E

(19) United States
(12) Reissued Patent
Hiroyuki

(10) Patent Number: US RE38,003 E
(45) Date of Reissued Patent: Feb. 25, 2003

(54) FILTERING APPARATUS FOR AN ELECTRONIC MUSICAL INSTRUMENT

(75) Inventor: Toda Hiroyuki, Hamamatsu (JP)

(73) Assignee: Yamaha Corporation, Hamamatsu (JP)

(21) Appl. No.: 09/315,679

(22) Filed: May 20, 1999

Related U.S. Patent Documents

Reissue of:
(64) Patent No.: 5,631,434
Issued: May 20, 1997
Appl. No.: 08/420,232
Filed: Apr. 11, 1995

U.S. Applications:
(63) Continuation of application No. 08/325,542, filed on Oct. 18, 1994, now abandoned, which is a continuation of application No. 08/081,069, filed on Jun. 22, 1993, now abandoned, which is a continuation of application No. 07/593, 683, filed on Oct. 4, 1990, now abandoned.

(30) Foreign Application Priority Data

Oct. 11, 1989 (JP) ..... 1-264469

(51) Int. Cl.[7] ..... G10H 1/02
(52) U.S. Cl. ..... 84/661; 84/DIG. 9
(58) Field of Search ..... 84/661, 673, 700, 84/659, 660, 624, 625, 735, 736, DIG. 9

(56) References Cited

U.S. PATENT DOCUMENTS

| | | | | | |
|---|---|---|---|---|---|
| 4,265,158 | A | * | 5/1981 | Takahashi | 84/661 |
| 4,301,704 | A | * | 11/1981 | Nagai et al. | 84/626 |
| 4,554,858 | A | * | 11/1985 | Wachi et al. | 84/622 |
| 4,813,328 | A | * | 3/1989 | Takauji | 84/DIG. 9 |
| 4,829,463 | A | * | 5/1989 | Kakishita et al. | 84/DIG. 9 |
| 4,854,209 | A | * | 8/1989 | Matsubara et al. | 84/478 X |
| 4,907,484 | A | * | 3/1990 | Suzuki et al. | 84/661 |
| 4,957,030 | A | * | 9/1990 | Suzuki | 84/604 |
| 5,117,726 | A | * | 6/1992 | Lisle et al. | 84/DIG. 9 |
| 5,157,623 | A | * | 10/1992 | Hayashi | 84/DIG. 9 |
| 5,173,567 | A | * | 12/1992 | Fujita | 84/607 |
| 5,250,748 | A | * | 10/1993 | Suzuki | 84/661 |
| 5,583,309 | A | * | 12/1996 | Fujita | 84/622 |

FOREIGN PATENT DOCUMENTS

| | | | |
|---|---|---|---|
| JP | 52-104222 | * | 2/1976 |
| JP | 56-16435 | | 4/1981 |
| JP | 57-195294 | | 11/1982 |
| JP | 57-207289 | | 12/1982 |
| JP | 58-25696 | | 2/1983 |
| JP | 58-200297 | * | 11/1983 |
| JP | 61-3430 | * | 2/1986 |
| JP | 61-45289 | | 3/1986 |
| JP | 63-239494 | * | 5/1987 |

* cited by examiner

*Primary Examiner*—Stanley J. Witkowski
(74) *Attorney, Agent, or Firm*—Morrison & Foerster LLP

(57) ABSTRACT

A filtering apparatus for an electronic musical instrument includes at least a digital filter. The digital filter has a frequency characteristic determined by a filtering parameter and performs a filtering operation on a musical tone signal inputted thereto. In addition, the filtering parameter is changed in accordance with a keycode signal representing a tone pitch of the musical tone signal. Thus, the frequency characteristic is varied in accordance with a keycode signal.

52 Claims, 9 Drawing Sheets

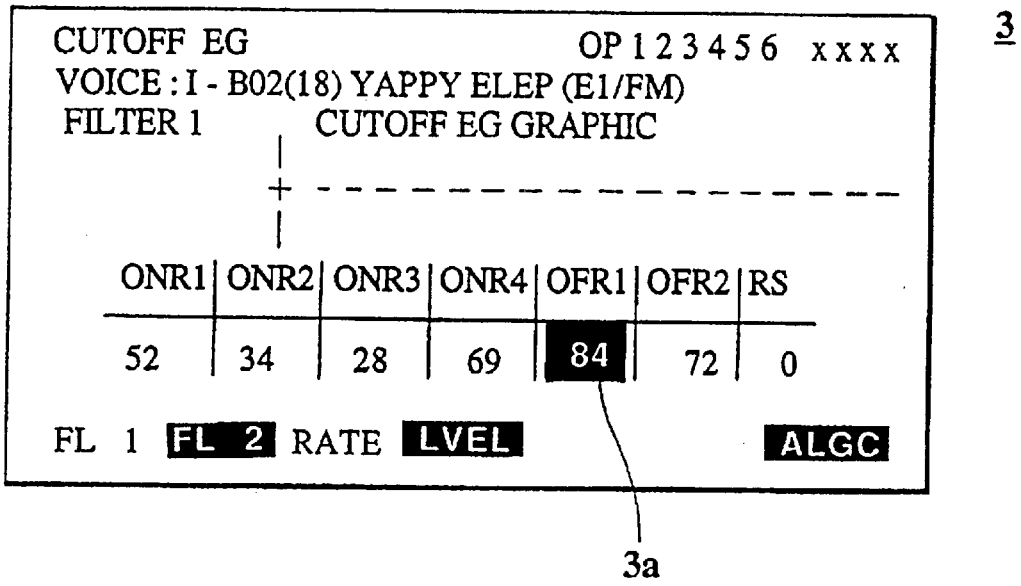
FIG. 2
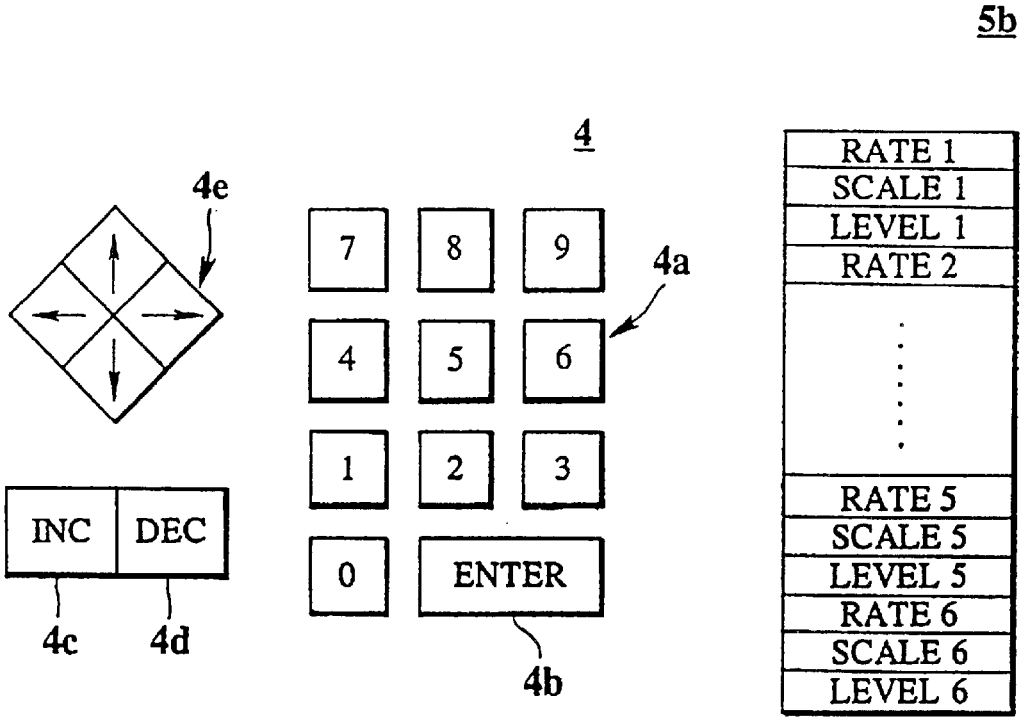
FIG. 3
FIG. 4

FILTERING APPARATUS FOR AN ELECTRONIC MUSICAL INSTRUMENT

Matter enclosed in heavy brackets [ ] appears in the original patent but forms no part of this reissue specification; matter printed in italics indicates the additions made by reissue.

This is a continuation of application Ser. No. 08/325,542, filed Oct. 18, 1994, now abandoned, which is a continuation of application Ser. No. 08/081,069, filed Jun. 22, 1993, now abandoned, which is a file wrapper continuation of application Ser. No. 07/593,683 filed on Oct. 4, 1990, now abandoned.

BACKGROUND OF THE INVENTION

1. Field of the Invention

The present invention relates to a filtering apparatus for an electronic musical instrument which varies tone volume and tone color of a musical tone in a manner similar to that of an acoustic musical instrument.

2. Prior Art

Conventionally, an electronic musical instrument provides an envelope generator (hereinafter referred to as "EG") which generates an envelope signal controlling the tone volume and the tone color of the musical tone signal, and memory storing data for controlling tone parameters concerning the tone volume and tone color by use of the EG. An example of such electronic musical instrument has been disclosed in U.S. Pat. No. 4,301,704, which application was filed by the same applicant of the present invention.

When the player depresses a key of a keyboard and the like, the electronic musical instrument reads out the data for controlling the tone parameter from the memory in response to a keycode corresponding to the depressed key, and then changes the tone volume and the tone color of the musical tone signal on the basis of the read-out data.

However, since the data for controlling the tone parameter is stored in the memory in advance, the variations of the tone volume and the tone color must be limited.

In addition, the parameters are respectively set by each tone color and tone pitch. Therefore, the conventional electronic musical instrument needs a large memory to store the data for controlling the parameters.

SUMMARY OF THE INVENTION

It is accordingly a primary object of the present invention to provide a filtering apparatus for an electronic musical instrument in which the tone parameter can be controlled easily by the player without enlarging the size thereof.

It is another object of the present invention to provide a filtering apparatus for an electronic musical instrument which can offer complicated variation of the tone color and generate the musical tone with a high degree of freedom.

Filtering apparatus for an electronic musical instrument, in accordance with the invention, includes cutoff frequency setting means for setting a cutoff frequency and filter parameter designating means for designating a plurality of control points for changing the cutoff frequency relatively in accordance with a lapse of time. Filter controlling means generates a filter control signal in response to the cutoff frequency and the control points. The cutoff frequency and the control points are supplied from the filter parameter designating means and change with the lapse of time. A digital filter effects a filtering operation on a musical tone signal inputted thereto. The filter has a frequency characteristic determined by the filter control signal.

Further in accordance with the invention, filtering apparatus for an electronic musical instrument comprises tone generating means for generating a tone signal having a predetermined pitch, cutoff frequency setting means for setting a cutoff frequency of filtering, and filter designating means for determining a plurality of control points changing relatively with a lapse of time, defining a segment between two adjacent control points, and generating a filter parameter by carrying out an interpolation operation between two adjacent control points. Controlling means generates a filter control signal in response to the cutoff frequency and in response to the information supplied from the filter designating means. The information changes with the lapse of time, and the controlling means changes a speed, in accordance with a tone pitch, at which the filter control signal is varied for at least one of the segments.

Still further in accordance with the invention, filtering apparatus for an electronic musical instrument comprises a digital filter having a frequency characteristic to be varied in a lapse of time and determined by a filtering parameter for effecting a filtering operation on a musical tone signal inputted thereto. Assignment means enables a player of the electronic musical instrument to assign a plurality of control points, each corresponding to the filtering parameter and to a cutoff frequency of the filter. Controlling means changes the filtering parameter and a variation manner of the frequency characteristic to be varied in a lapse of time in accordance with a limit set according to the cutoff frequency.

Still further in accordance with the invention, filtering apparatus for an electronic musical instrument for generating musical tones comprises tone designating means for designating generation of the musical tones and ending of the musical tones. Tone generating means generates a musical tone having a predetermined pitch in accordance with an output of the tone designating means. Filter parameter designating means varies a filtering parameter, wherein the filter parameter designating means enables a player to set a plurality of control points each corresponding to the filtering parameter with respect to a lapse of time. A filtering parameter corresponding to a point to be inserted between two adjacent control points is obtained by carrying out an interpolation operation with respect to the key code. Filter means filters the musical tone based on the parameters.

BRIEF DESCRIPTION OF THE DRAWINGS

FIG. 2 is a diagram showing an example of the display shown in FIG. 1;

FIG. 3 is an example of the operational panel shown in FIG. 1;

FIG. 4 is a diagram showing an example of a construction of a data area of a memory shown in FIG. 1;

DETAILED DESCRIPTION OF EMBODIMENTS

[A] BASIC OPERATION OF PRESENT INVENTION

The following describes the basic operation of the present invention.

In a conventional electronic musical instrument, the musical tone signal outputted from the sound source is filtered by a filter having a variable frequency characteristic to simulate the acoustic sounds of an acoustic musical instrument. In this filter, by varying the cutoff frequency of the filter in response to the keycode, the electronic musical instrument can accurately simulate the acoustic sound. For example, if the cutoff frequency is uniformly applied for the sound source signals corresponding to all keycodes, the musical tone is weaker in a higher-pitch area. On the other hand, the musical tone in a lower-pitch area must contain overtones of higher harmonic frequencies. Accordingly, the tone color must be changed between the higher-pitch and lower-pitch areas, so that the generated musical tone is different from the acoustic sound.

To eliminate the above-mentioned problem, it is possible to provide a digital filter. In this case, the digital filter can easily control the frequency characteristic thereof in a time sharing system by using the cutoff frequency as the parameter. Hereinafter, "DCF" indicates the digital controlled filter.

Figure 15:
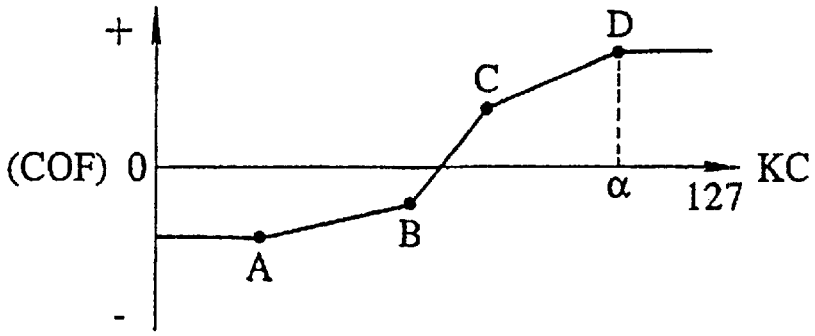
FIG. 15 is a graph showing an example of a relation between cutoff frequency and keycode of the digital filter shown in FIG. 1.

In the digital control filter (DCF), the cutoff frequency COF can be changed based on the control point designated corresponding to key codes (KC). For example, as shown in FIG. 15, when one of the control points A through D is designated, if the value of the key code (KC) becomes "α", then the value of the cutoff frequency COF becomes "COF+ D". Moreover, each of the key codes (KC) located between the control points A through D can be linearly interpolated using the two adjacent control points and the cutoff frequency COF can be calculated therefrom.

Figure 16:
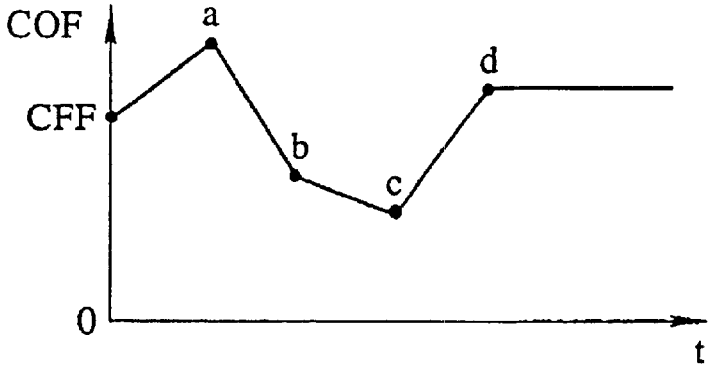
FIGS. 16 and 17, 19 are graphs each showing the variation of cutoff frequency to be varied over a lapse of time.

Based on the center frequency CFF of the cutoff frequency COF which is computed by each keycode KC as described above, the player inputs the relative value corresponding to the center frequency CFF at each control point and a variation rate RATE by operating the operation panel 4. Herein, the variation rate RATE is defined as the inclination of a curve between two adjacent control points. As shown in FIG. 16, by use of the relative value and variation rate to be inputted, the center frequency CFF of the cutoff frequency COF is controlled over a lapse of time passing after the key-on timing. Thus, although the cutoff frequency COF is set equal to the center frequency CFF at the key-on timing, the cutoff frequency COF is varies in accordance with a first variation rate RATE (i.e., the inclination of the curve reaching the control point a); and then it is varied in accordance with a second variation rate (i.e., the inclination of the curve between the control points a and b). Similarly, the cutoff frequency COF is varied with respect to the other control points (e.g., C and D). After the control point d, the cutoff frequency COF is maintained at a constant value.

Figure 17:
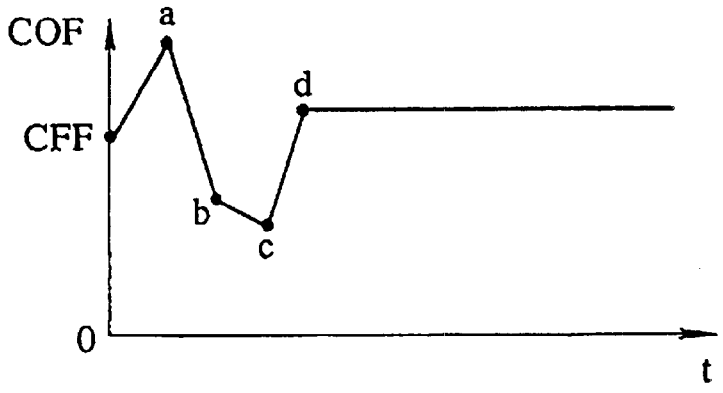
Figure 18:
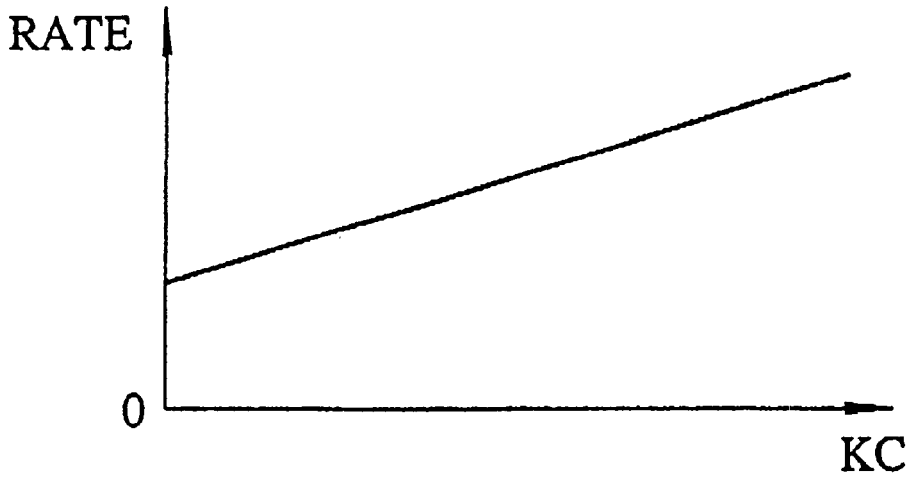
FIG. 18 is a graph showing an example of a curve representing a variation rate of the cutoff frequency.

Further, the frequency characteristic as shown in FIG. 16 is converted into the frequency characteristic as shown in FIG. 17 by use of the rate-key-scaling curve as shown in FIG. 18. Herein, the rate-key-scaling curve represents a type of weighted function which has a value (i.e., rate scaling value) that is varied over a lapse of time. For example, according to this rate-key-scaling curve, the variation rate RATE is doubled when the corresponding frequency is doubled. By scaling the variation rate RATE as described above, the time-lapse characteristic of the cutoff frequency COF can be controlled with respect to each keycode.

Therefore, it is possible to control the tone parameters such as the tone volume and the tone color easily without enlarging the size of the electronic musical instrument. In addition, it is possible to simulate the complicated variation of the tone color and also raise the degree of freedom when generating the musical tones.

[B] CONFIGURATION OF EMBODIMENT

Referring to the drawings, like reference characters designate like or corresponding parts throughout the several views.

Figure 19:
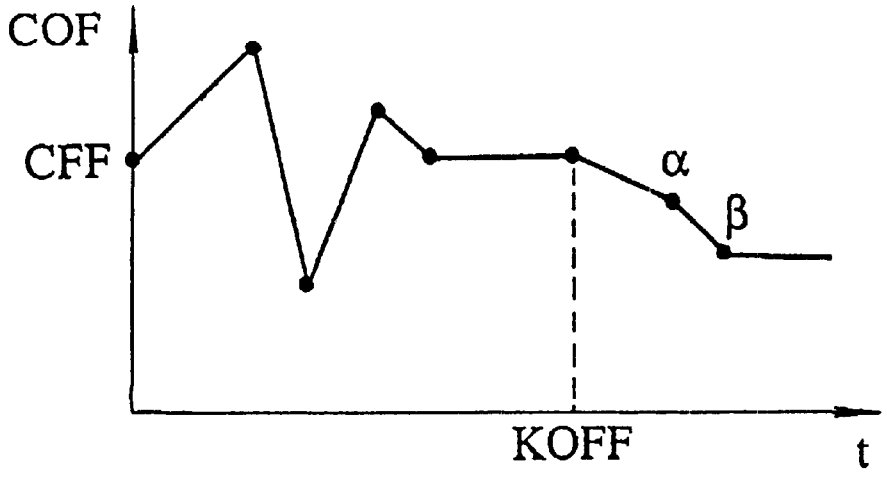

For convenience sake, the control points based on the first method have previously been described (see FIG. 15). In addition, other control points based on the second method (see FIG. 16) are set using the foregoing four points, i.e., "a" to "d" as shown in FIG. 16 at the key-on state, while the key-off states are set as the foregoing two points, i.e., α and β as shown in FIG. 19. As a result, the number of control points used in the second method is six.

Figure 1:
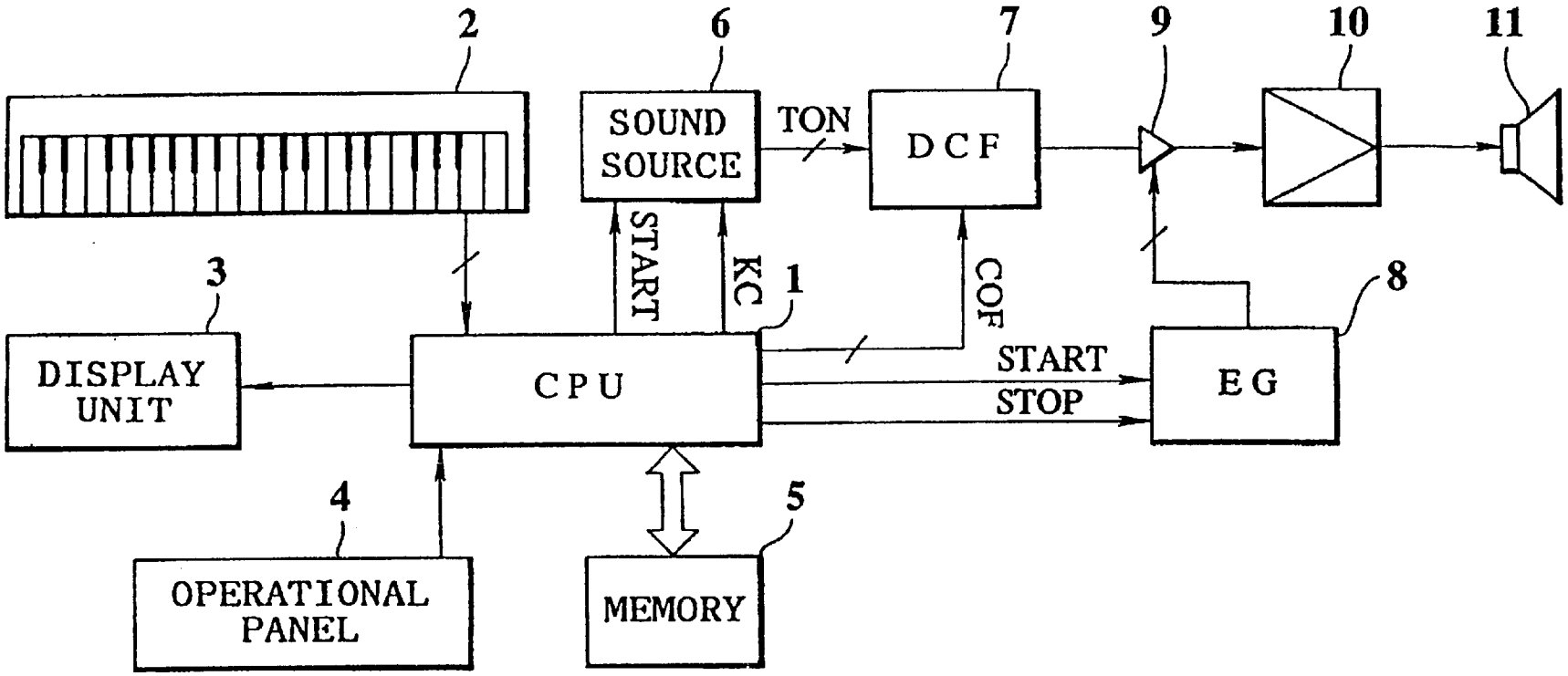
FIG. 1 is a block diagram showing a configuration of a filtering apparatus for an electronic musical instrument according to an embodiment of the present invention.

FIG. 1 is a block diagram showing a configuration of a filter apparatus for an electronic musical instrument according to an embodiment of the present invention. In FIG. 1, 1 designates a central processing unit (CPU) controlling several portions of the apparatus, and 2 designates a keyboard. The keyboard 2 generates and outputs a key-on-signal KON, a key-off signal KOFF, a key-on speed signal KV, a key-off speed signal KOFFV (corresponding to touch information) and a key code signal KC to the CPU 1. In addition, 3 designates a display unit configured by a crystalline liquid panel and the like, wherein the display unit 3 displays an image on its screen (see FIG. 2). The number 4 designates an operational panel having a ten-key unit 4a, an enter-key 4e for moving a cursor 3a in the display image. Operational panel 4 supplies a musical tone signal to the CPU 1 in response to each key state.

The number 5 designates a memory having a program area 5a (not shown) for storing a control program for use in the CPU 1, data area 5b for temporarily storing data and several kinds of registers and the like. Herein, the data area 5b stores: values of the tone parameters such as the variation rates $RATE_1$ to $RATE_6$ (each value ranging from −128 to 127), each indicating the variation rate between two control points in a cutoff frequency COF of the DCF to be set by the user; scaling constants $SCALE_1$ to $SCALE_6$ each designating whether or not to scale the variation rate RATE (i.e., whose value is "1" when scaling the variation rate but "0" when not scaling the variation rate); and target values $LEVEL_1$ to $LEVEL_6$ (each value ranging from −128 to 127) designating the relative value of each control point. These parameters are set by the user.

Further, 6 designates a sound source for receiving both a tone-generation start request signal START and the keycode signal KC supplied from CPU 1 and then outputting a sound source signal TON to the DCF 7. The DCF 7 receives the sound source signal TON and data concerning the time-sharing control of the cutoff frequency COF from the CPU 1. The data represents information such as a center frequency CFF of the cutoff frequency COF, the variation rate RATE, the target value LEVEL, an interpolation speed SI indicating the speed of interpolating the center frequency CFF between two adjacent control points and the like. The DCF 7 supplies a musical tone signal to a multiplier 9. The DCF 7 includes a digital control filter which is constructed as a multi-stage digital filter by employing the time sharing system. The DCF 7 varies the cutoff frequency in the direction of the target value LEVEL in response to the interpolation speed SI at each control point when the target value LEVEL is set. Therefore, the musical tone signal passing through the DCF 7 will be subject to the filtering process in a complicated manner.

Furthermore, 8 designates an envelope generator (i.e., EG) which receives both the tone-generation start request signal START and a tone-generation stop request signal STOP from the CPU 1. The EG 8 generates an envelope signal of the musical tone signal and supplies it to the multiplier 9. The multiplier 9 multiplies the musical tone signal from the DCF 7 by the envelope signal, and then supplies the result to an amplifier 10. The amplifier 10 amplifies the signal supplied from the multiplier 9, and then supplies the result of amplification to a speaker 11.

[C] OPERATION OF EMBODIMENT

The following describes the operation of the present invention in conjunction with FIGS. 5 to 14.

Figure 5:
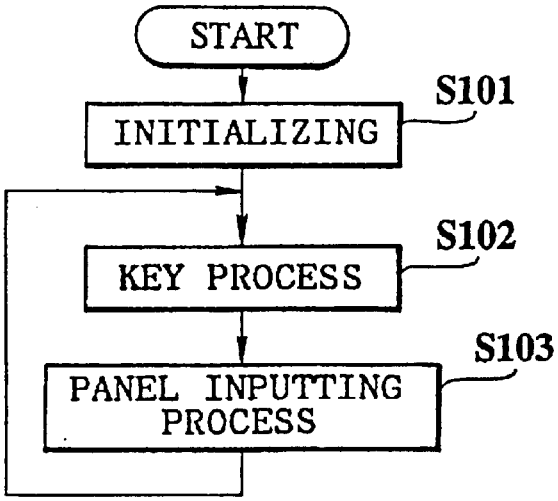
FIGS. 5 to 14 are flowcharts showing processes to be executed by a CPU shown in FIG. 1.

FIG. 5 is a flowchart showing the main routine of the CPU 1. When power is applied to the electronic musical instrument, the CPU 1 starts the operation in accordance with the control programs stored in the program area 5a of the memory 5. First, in step S101, the CPU 1 executes an initializing routine which initializes several portions of the apparatus. More specifically, in each control point of the data area 5b, data value "0" is stored as the variation rates $RATE_1$ to $RATE_6$ and similarly date value "99" (i.e., maximum value) is stored as the target values $LEVEL_1$ to $LEVEL_6$.

Next, the processing proceed to step S102 wherein a key routine is executed. The key routine will now be described with reference to FIG. 6. In step S201, it is judged whether the key-on signal KON is supplied to the CPU 1. If the result of this step S201 is "YES", the processing proceeds to step S202 wherein the key-on speed KV is detected, and then the processing proceed to step S203. In step S203, the key-on signal KON is initialized. The initializing routing corresponding to step S203 will now be described with reference to FIG. 7. In step S301, a DCF flag, which is used to request that the CPU 1 compute the cutoff frequency COF of the DCF 7, is set at "1". Incidentally, when the DCF flag is at "1", the cutoff frequency COF of the DCF 7 will be controlled.

Next, the processing proceeds to step S302 wherein the cutoff frequency is computed in response to the keycode KC corresponding to the key-on signal KON to be inputted and is then converted into the cutoff frequency COF by effecting the cutoff-key-scaling in a work register COFR used for the cutoff frequency. For example, when the keycode KC corresponds to a position placed between the control points A and B, the corresponding cutoff frequency COF value is obtained by effecting the linear interpolation on the relative values corresponding to the control points A and B.

Next, the processing proceeds to step S303 wherein the cutoff frequency COF converted in the work together COFR used for the cutoff frequency is stored in a center frequency hold register CFR as the center frequency CFF. Thereafter, in step S304, "1" is stored in a parameter coefficient designating register NR, while "5" is stored in a parameter upper-limit setting register MR. The reason why such values are stored in the registers NR and MR is that there are provided four control points in the present embodiment (see control points a to d in FIG. 16). In the next step S305, the number of the control point to be processed in this routine is stored in a parameter read-out register KR. For example, when the control point "a" shown in FIG. 16 is processed, a "1" indicating the number of such control point "a" is stored in this register KR. Then, the stored number, i.e., stored parameter, is read from the register KR.

Figure 8:
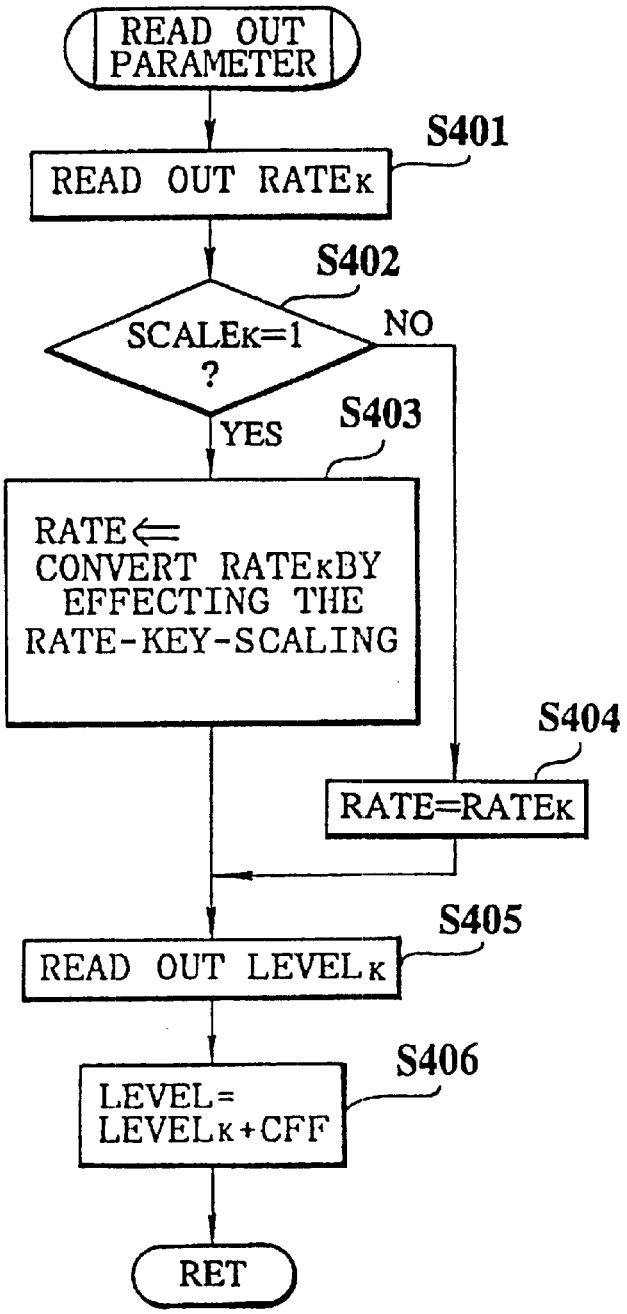

The tone parameter read-out routine is shown in FIG. 8. In step S401, the variation rate $RATE_K$, i.e., $RATE_1$, set by the user, is read from the data area 5b of the memory 5. Thereafter, in step S402, it is judged whether or not the scaling constant $SCALE_K$, i.e., $SCALE_1$, set by the user is "1". In other words, it is judged whether or not the variation rate $RATE_1$ is varied. If the result of this step S402 is "YES", the processing proceeds to step S403 wherein the $RATE_K$ having the value 1 at this time is subject to the foregoing rate-key-scaling in a work register $RATE_R$ used to process RATE. For example, the variation rate $RATE_1$ is varied in response to the value set by the user based on the keycode KDC. Thereafter, the processing proceeds to step S405.

On the other hand, if the result of step S402 is "NO", the processing proceeds to step S404 wherein the variation rate $RATE_K$ which is equal to $RATE_1$ is stored in the work register $RATE_R$ used for the variation rate RATE as the new variation rate RATE; and then, the processing proceeds to step S405. In step S405, the target value $LEVEL_K$ set by the user is read out from the data area 5b of the memory 5, and then the processing proceeds to step S406. In step S406, the target value $LEVEL_K$ which is equal to $LEVEL_1$ is added to the center frequency CFF in a work register $LEVEL_R$ used for the target value LEVEL, and the sum obtained is used for the target value LEVEL, after which the processing returns to the key-on initializing routine as shown in FIG. 7.

Figure 7:
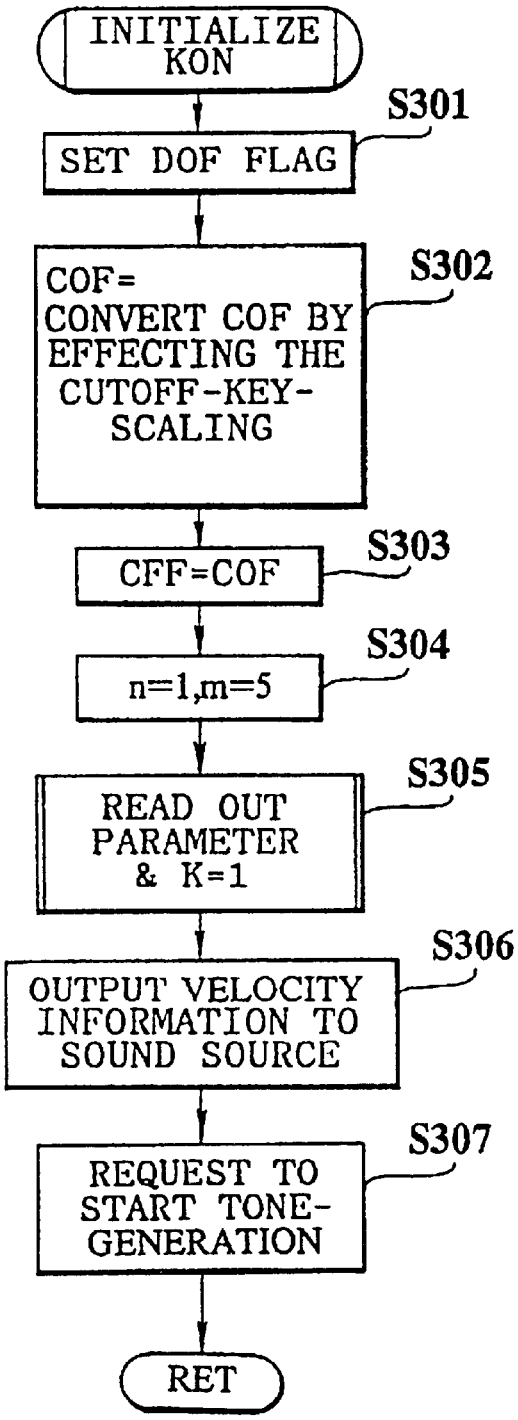

In routine shown in FIG. 7, in step S306, velocity information representing the key speed is outputted to the sound source 6 from the CPU1, and the proceeds to step S307, the tone-generation start request signal START is outputted to both the sound source 6 and the EG 8. Thus, the sound signal TON is outputted to the DCF 7 from the sound source 6, and is filtered in the DCF 7, after which its is outputted as the musical tone signal. Next, the musical tone signal is added to an envelope signal outputted from the EG 8 in the multiplier 9, after which the resulting signal is amplified in the amplifier 10, and then outputted from the speaker 11.

Figure 6:
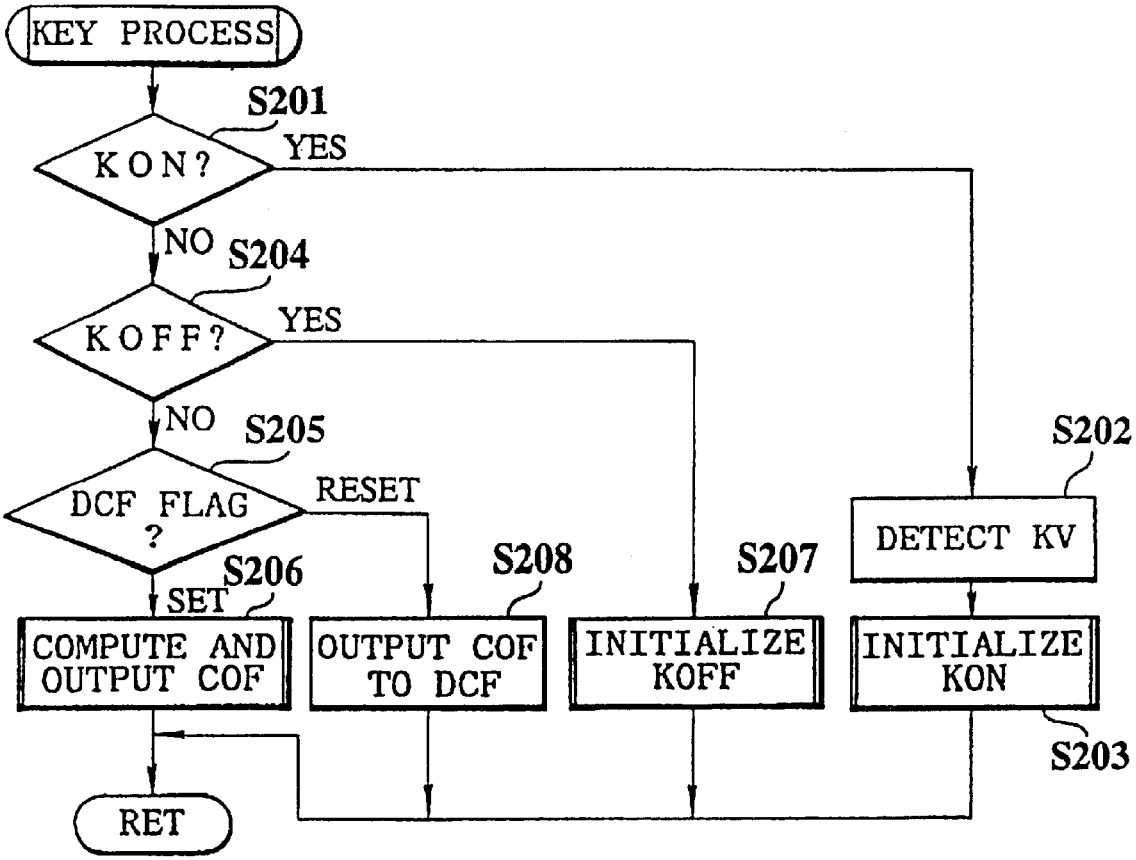
Figure 9:
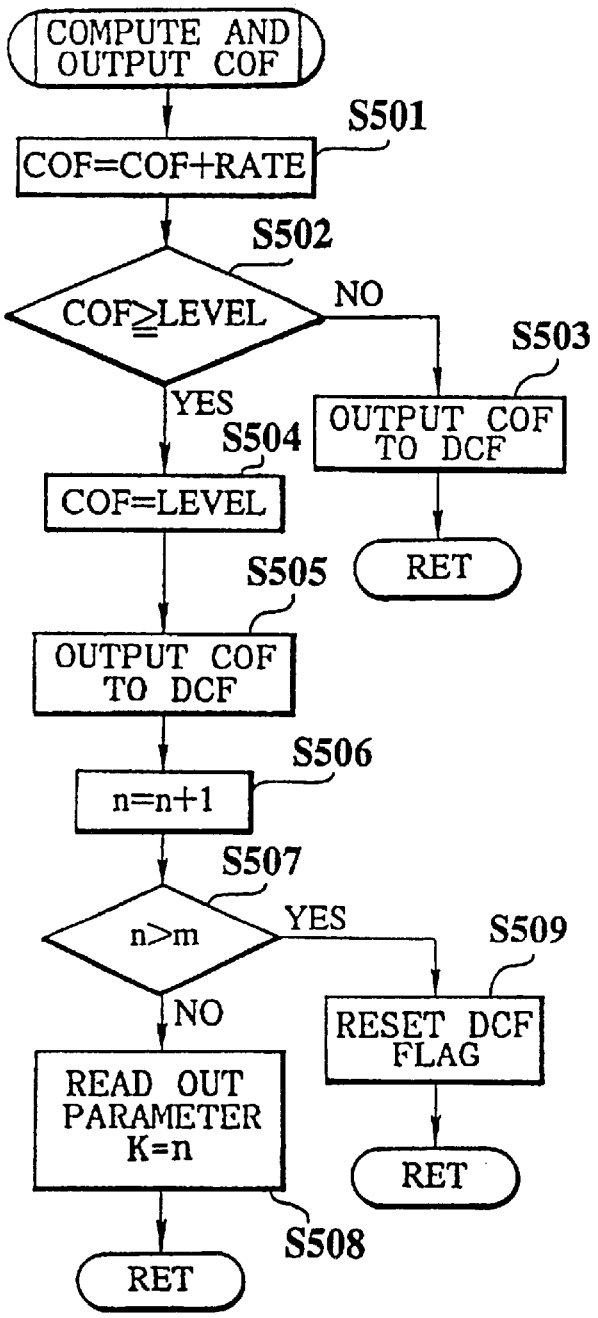
Figure 10:
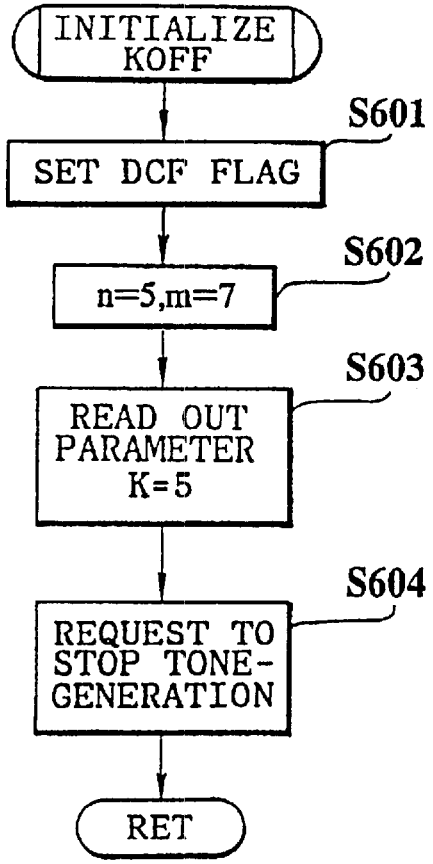

The CPU 1 returns to step S103 in the main routine of FIG. 5 after executing the key routing shown in FIG. 6. In step S103, the CPU 1 executes the panel inputting routine which will be described later, and then returns to step S102. In step S102, the key routine is executed again, whereby the routine proceeds to step S201 shown in FIG. 6. In step S201, it is judged whether or not the key-on signal has been inputted to the CPU 1 from the keyboard 2. Since the musical tone signal has been outputted, the result of this step S201 is "NO", and the routine proceeds to step S204. In step S204, it is judged whether or not the key-off signal KOFF has been inputted to the CPU 1 from the keyboard 2. Since the musical tone signal has similarly been outputted, the result of this step S204 is also "NO", and the routine next proceeds to step S205. In step S205, it is judged whether or not the flag DCF is set to "1". Since the flat DCF has been set to "1" by the above-mentioned key-on initializing routine, the result of this step S205 is "YES", and the routine proceeds to step S206. In step S206, the CPU 1 executes the computing and outputting routine of the cutoff frequency COF which is shown in FIG. 9.

In the routine shown in FIG. 7, in step S510, the cutoff frequency COF stored previously in the work register COFR used for this cutoff frequency is added to the variation rate RATE stored in the work together $RATE_R$ used for the variation RATE, and the result is used for the new cutoff frequency COF. Thereafter, the processing proceeds to step S502. In step S502, it is judged whether or not the value of the cutoff frequency COF is greater than or equal to the target value LEVEL. In other words, judgement is made as to whether or not the cutoff frequency COF has yet reached the target value LEVEL, the cutoff frequency COF being originally equal to CFF when one of the keys on the keyboard 2 was depressed, and has since that time been varied based on the first variation rate RATE so as to approach the control point 1. Because a key-on event has just occurred, the judgment result of this step S502 is "NO", and the routine proceeds to step S503. In step S503, the cutoff frequency COF is outputted to the DCF 7 from the CPU 1. Thus, the cutoff frequency COF of the DCF 7 which corresponds to keycode KC will start to be varied at frequency CFF. Then, the CPU 1 returns to the main routine shown in FIG. 5, and then executes the key routine shown in FIG. 6. Thereafter, the above-mentioned loop routines are repeatedly executed. Accordingly, the value of the cutoff frequency COF will be greater than the target value LEVEL. In other words, the cutoff frequency COF which has been varied based on the variation rate RATE from the first value CFF at the key-on event on timing so as to approach the control point a, and to finally equal the target value LEVEL, at which time the judgment result of step S502 will change to "YES", after which the routine proceeds to step S504. In step S504, the above-described cutoff frequency COF is stored in the work register COFR used for the cutoff frequency as the target value LEVEL. Since the value of the variation rate RATE is large so that the cutoff frequency COF will be greater than the target value LEVEL, if this cutoff frequency COF having the above-mentioned value is directly supplied to the DCF 7, it is possible that it exceeds the working range of the DCF 7. Therefore, the above-mentioned cutoff frequency COF is written into the work register COFR as the new target value LEVEL.

Next, the processing proceeds to step S505 wherein the newly set cutoff frequency COF is supplied to the DCF 7 from the CPU 1. Thus, the cutoff frequency COF of the DCF 7 from the CPU 1. Thus, the cutoff frequency COF of the DCF 7 corresponding to key code KC will start to be varied so as to approach a control point b which equals the target value LEVEL. Next, the processing proceeds to step S506 wherein a variable n previously written into the parameter coefficient designating register NR is added to "1". Then, in step S507, it is judged whether or not the variable n written into the register NR is greater than a variable m written into the parameter upper-limit setting register MR for the musical parameter. If the result is "NO", in other words. If computation and output of the cutoff frequency COF corresponding to all of the four control points is not complete, the routine proceeds to step S508. In step S508, the value of variable n (in this case is equal to "2") is written into the parameter coefficient designating register NR for the tone parameter coefficient that is stored in the parameter read-out register KR. In other words, the control point which is to be processed in this routine is set to control point b shown in FIG. 16. Also, in step S508, the tone parameter is read out in the key-on initializing routine (see FIG. 8), as was described previously for step S305. Thereafter, the CPU 1 returns to step S103 in the main routine of FIG. 5 after executing the key routine shown in FIG. 6.

On the other hand, if the result of step S507 is "YES", the processing proceeds to step S509 wherein the flag DCF is reset, and then the CPU 1 returns to step S103 in the main routine of FIG. 5, after executing the key routine shown in FIG. 6. In step S103, the CPU 1 executes the panel inputting routine which will be described later, and then returns to step S102. In step S102, the key routine is executed again, and the processing proceeds to step S201 shown in FIG. 6. In step S201, it is judged whether or not the key-on signal has been inputted to the CPU 1 from the keyboard 2. At this time, the musical tone signal has been outputted for which reason the result of this step S201 is "NO", and the routine proceeds to step S204. In step S204, it is judged whether or not the key-off signal KOFF has been inputted to the CPU 1 from the keyboard 2. At this time, if the key previously depressed on keyboard 2 has been released by the player, output of the musical tone signal is stopped so that the result of this step S204 will be "YES", after which the routine proceeds to step S207. In step S207, the key-off operation is initialized. The initializing routine corresponds to step S207 which will now be described with reference to FIG. 10. In step S601, a DCF flag requests computation of the cutoff frequency COF of the DCF 7 is set to "1". Next the routine process to step S602 wherein "5" is stored in the parameter coefficient designating register NR, and "7" is stored in the parameter upper-limit setting register MR. The reasons why such values are stored in the registers NR and the MR is that they are employed as control points in the present embodiment (see control points $\alpha$ and $\beta$ in FIG. 19). Next, in step S603, the value for a control point to be processed in this routine, corresponding to control point $\alpha$ shown in FIG. 19 whose value is equal to "5", is stored in the parameter read-out register KR, and then this tone parameter is read out. This operation of reading out the tone parameter is similar to the previously described step S305 in the above-mentioned key-on initializing routine (see FIG. 8).

Next, the processing proceeds to step S604 wherein the tone-generation stop request signal STOP is outputted to the EG 8 from the CPU 1. Thus, the musical tone signal will be attenuated slowly. The CPU 1 returns to step S103 in the main routine of FIG. 5 after executing the key routine shown in FIG. 6. In step S103, the CPU 1 executes the panel inputting routine, which will be descried later, and then returns to step S102. In S102, the key routine is executed again, and the routine proceeds to step S201 shown in FIG. 6. In step S201, it is judged whether or not the key-on signal KON has been inputted to the CPU 1 from the keyboard 2. If the judgment result of this step S201 is "NO", the routine then proceeds to step S204. In step S204, it is judged whether or not the key-off signal KOFF has been inputted to the CPU 1 from the keyboard 2. If the judgment result of this step S204 is also "NO", the routine then proceeds to step S205. In step S205, it is judged whether or not the flag DCF has been set to "1". The judgment result of this step S205 is "NO", and thus the routine proceeds to step S208. In step S208, the cutoff frequency COF is outputted the DCF 7 from the CPU 1, and then the CPU 1 returns to the main routine, proceeding to S103.

The processes as described above as executed so that the cutoff frequency of the DCF is varied, as shown in FIG. 16 to FIG. 18, in response to each key operation by the user. This means that the user can vary the characteristics of the DCF 7.

Next, the panel input executing process of the main routine will be described.

Figure 11:
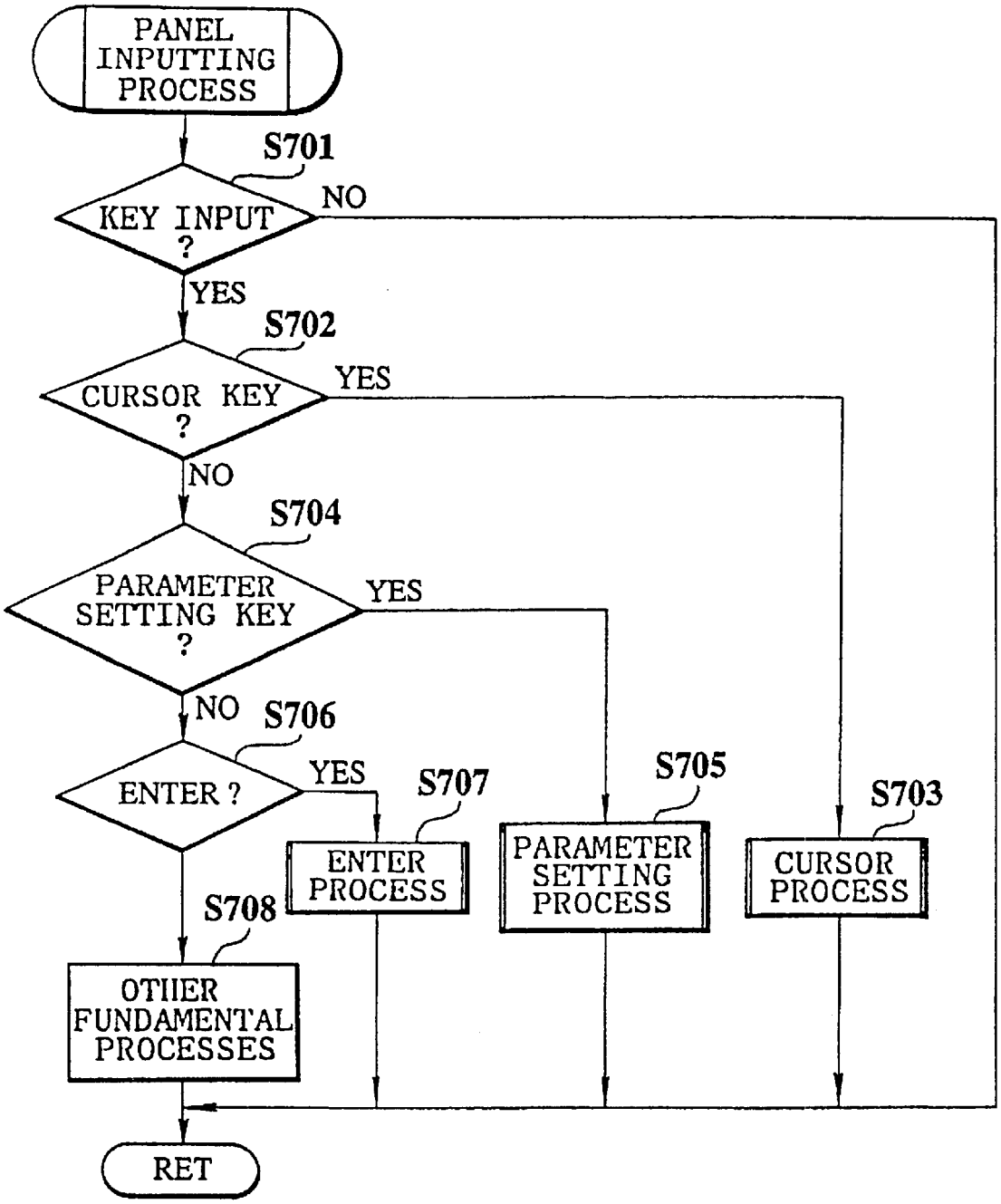
Figure 12:
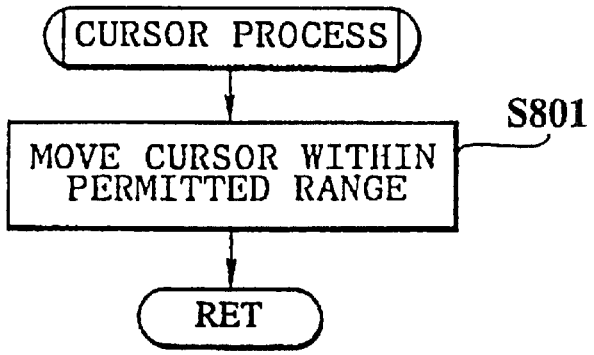
Figure 13:
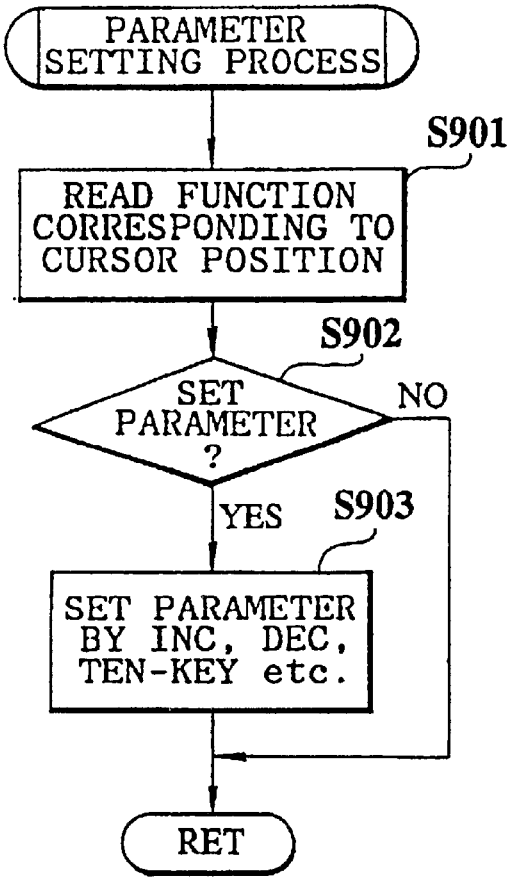
Figure 14:
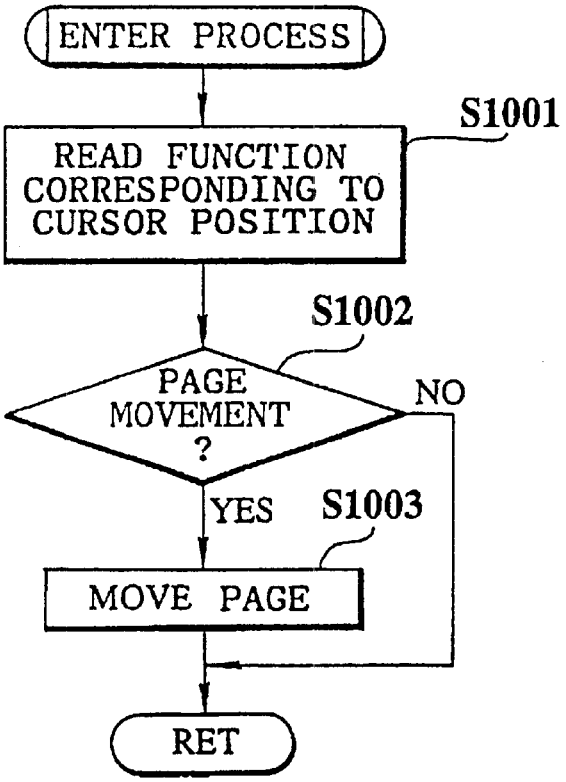

In FIG. 5, the processing proceeds to step S103 wherein the panel input executing process is executed. This process will now be described with reference to FIG. 11. In step S701, it is judged whether or not a key of he operational panel 4 has been depressed so as to generate a musical tone signal in response to each key. If the judgment result of this step S701 is "NO", the CPU 1 returns to step S102 in the main routine of FIG. 5. On the other hand, if the result of this step S701 is "YES", processing proceeds to step S702 wherein it is judged whether or not the cursor-key 4e of the operational panel 4 as shown in FIG. 3 has been executed. If the judgment result of step S702 is "YES", the processing proceeds to step S702. In step S703, the cursor process is executed. This process will now be described with reference to FIG. 12. In step S801, cursor 3a is moved by the user within the permittable range in display unit 3, after which the processing proceeds to the panel inputting process routine as shown in FIG. 11, and then returns to step S201 of main routine in FIG. 5.

On the other hand, when the judgment result of step S702 is "NO", the processing proceeds to step S704 wherein it is judged whether or not the key used for setting a tone parameter has been is operated. If the result is "YES", the processing proceeds to step S705, wherein a setting process for setting a tone parameter is executed. This setting process will now be described with reference to FIG. 13. In step S901, the function corresponding to a present position of the cursor 3a will be given for this cursor 3a. For example, if cursor 3a has been positioned at the location for varying variation rate $RATE_1$ of control point a, the corresponding function will then be initiated.

Next, the processing proceeds to step S902 wherein it is judged whether or not the tone parameter has been set. If the result is "NO", the processing proceeds to the panel inputting process routine as shown in FIG. 11, and then returns to step S201 of the main routine in FIG. 5. On the other hand, if the judgment result of this step S902 is "YES", the routine proceeds to step S903 wherein the tone parameter is set in response to operation of various keys, such as the increment key 4c, the decrement key 4d, the ten key 4a and the like, when the user operates one of these keys of operational panel 4. The processing then proceeds to the panel inputting process routine as shown in FIG. 11, and then returns to step S201 of the main routine in FIG. 5. On the other hand, if the result of step S704 is "NO", the routine process to step S706 wherein it is judged whether or not the enter-key 5b of the operational panel 4 as shown in FIG. 3 has been operated. If the result is "NO", the routine proceeds to step S708 wherein other fundamental processes are executed. On the other hand, if the result is "YES", the routine process to step S707 wherein an enter process routine is executed. This enter process routine will now be described with reference to FIG. 14. In step S1001, the function corresponding to a present position of th cursor 3a will be given for this cursor 3a. For example, if the cursor 3a is positioned at a location corresponding to a request to move a page of the display image, the cursor 3a will initiate the corresponding function.

Next, the processing proceeds to step S1002 wherein it is judged whether or not there has been a request to move the page. If the result is "NO", the processing proceeds to the panel inputting process routine as shown in FIG. 11, after which the routine returns to step S201 of the main routine shown in FIG. 5. On the other hand, if the result of step S1002 is "YES", the routine proceeds to step S1003 wherein the page is moved. For example, the display image of the display unit 3 is changed to display a graphic image of the target value LEVEL from a display of the graphic image of variation rate RATE as shown in FIG. 2. The processing then proceeds to the panel inputting process routine as shown in FIG. 11, after which the routine returns to step S201 of the main routine shown in FIG. 5.

The panel inputting process as described above is executed for each key-on or key-off event signal from the keyboard 2. Thus, the tone parameter corresponding to the tone color of the DCF 7 can be varied freely by the user. The DCF 7 is used to vary the timbre for which reason the range of producible sounds is wide.

Furthermore, because rate-key-scaling is possible, the natural sounds of a conventional musical instrument can be achieved as the rate of change of the timbre varies depending on the key operated.

Moreover, on/off operation of rate-key-scaling can be executed at any point of the envelope signal. Therefore, it is possible to execute rate-key scaling with variation only in the attack part of the envelope signal or only in the sustain part.

While in the illustrated preferred embodiment the cutoff frequency of the DCF is varied, the tone parameter corresponding to characteristics of the filter such as Q (corresponding to quality of resonance in the filter circuit) or the incline of the rate in the cutoff frequency may alternately be varied.

The above is a description of a preferred embodiment of the present invention. This invention may be practiced or embodied in still other ways without departing from the spirit or essential character thereof as described heretofore. Therefore, the preferred embodiment described herein is illustrative and not restrictive, the scope of the invention being delineated by the append claims. All variations which come within the scope of the claims are intended to be encompassed therein.

What is claimed is:

1. A filtering apparatus for an electronic musical instrument comprising:

center frequency setting means for first setting a fundamental frequency, the center frequency setting means also setting, based upon an inputted keycode signal, a relative frequency that is a function of a plurality of keycodes, the center frequency setting means including an adder for calculating a center frequency which is a sum of the fundamental frequency and the relative frequency, the center frequency being used throughout a duration of a musical tone;

center frequency varying means for generating a relative center frequency which varies over a lapse of time, the relative center frequency representing a variation about the center frequency;

a filter characteristic adder for calculating a filter characteristic that includes a cutoff frequency determined by the sum of the center frequency and the relative center frequency to thereby implement a time-variant filter frequency characteristic having a cutoff frequency which changes about the center frequency over the lapse of time; and digital controlled filter means for effecting a filter operation on a musical tone signal inputted thereto in accordance with the filter characteristic determined by the filter characteristic adder.

2. A filtering apparatus for an electronic musical instrument according to claim 1, wherein the relative center frequency of the filter characteristic is also controlled to vary as a function of the inputted keycode signal.

3. A filtering apparatus for an electronic musical instrument according to claim 2, wherein the filter characteristic adder sets the cutoff frequency of the filter characteristic with respect to each of the plurality of keycodes.

4. A filtering apparatus for an electronic musical instrument according to claim 1, wherein the digital controlled filter means includes a multi-stage digital controlled filter.

5. A filtering apparatus for an electronic musical instrument according to claim 1, wherein the center frequency and the relative center frequency are key [sealed] *scaled* by designating control points that correspond to keycodes and which are interpolated to provide filter parameters.

6. A filtering apparatus for an electronic musical instrument comprising:

a digital filter using a cutoff frequency for effecting a filtering operation on a musical tone signal inputted thereto;

filter parameter designating means for designating a fundamental filter parameter and a relative filtering parameter based on a plurality of control points corresponding by keycodes, the filter parameter designating means including an adder to designate an initial center filtering parameter that is the sum of the fundamental filter parameter and the relative filtering parameter, wherein the designated initial center filtering parameter is maintained throughout a duration of the musical tone signal and is used to change a filtering characteristic of the digital filter over a lapse of time;

center parameter varying means for changing the relative filtering parameter in accordance with a keycode signal inputted thereto representing a tone pitch of the musical tone signal, wherein the center parameter varying means sets the plurality of control points each corresponding to keycodes to establish the relative filtering parameter with respect to the inputted keycode signal, in which a relative filtering parameter corresponding to a point to be inserted between two adjacent control points is obtained by carrying out an interpolation operation with respect to the inputted keycode signal, and wherein, when said relative filtering parameter to the corresponding to a point which is not included between two of said control points, the relative frequency parameter is set identical to the relative filtering parameter corresponding to the nearest control point; and cutoff frequency setting means for relatively and variably setting a cutoff frequency of the digital filter over the lapse of time relative to the designated initial center filtering parameter, wherein the digital filter performs the filtering operation based on the cutoff frequency.

7. A filter control apparatus comprising:

storage means for storing level data and rate data in connection with at least one set of control points for controlling a cutoff frequency which is varied over a lapse of time, wherein each of the level data represents a relative frequency value with respect to the cutoff frequency between two of the at least one set of control points, and wherein each of the rate data is provided to control a rate of variation of the cutoff frequency between the two of the at least one set of control points;

a CPU that varies the cutoff frequency from a first cutoff frequency corresponding to one of the two of the at least one set of control points to a second cutoff frequency corresponding to the other of the two of the at least one set of control points at the rate of variation, and wherein the second cutoff frequency is equivalent to a sum of the first cutoff frequency and one of the level data which corresponds to the other of the two of the at least one set of control points;

tone-pitch designating means for designating a tone pitch of a sound to be produced;

control means for scaling the rate of variation in accordance with the tone pitch designated by the tone-pitch designating means; and filter means using the cutoff frequency for effecting a filtering operation on a musical tone signal inputted thereto.

8. A filter control apparatus according to claim 7, wherein the control means receives decision information from the storage means representative of a decision as to whether to scale the rate of variation between the at least one set of control points, so that the rate-key scaling is performed in accordance with the decision information.

9. A filter control apparatus according to claim 8, wherein the decision information is used to interpolate between a pair of the control points among the at least one set of control points when the tone pitch is between the pair of control points and to maintain a value determined from a nearest control point from among the at least one set of control points when the tone pitch is outside the at least one set of control points.

10. A filter control apparatus according to claim 7, wherein the level data and the rate data are set by a performer.

11. A filtering apparatus for an electronic musical instrument, the apparatus comprising:

a center frequency setting circuit that first sets a fundamental frequency, the center frequency setting circuit also setting, based upon an inputted keycode signal, a relative frequency that is determined based upon a key code value, the center frequency setting circuit further includes an adder that calculates a center frequency which is a sum of the fundamental frequency and the relative frequency, the center frequency being used throughout a duration of a musical tone;

a center frequency varying circuit that generates a relative center frequency which varies over a lapse of time, the relative center frequency representing a variation about the center frequency;

a filter characteristic adder that calculates a filter characteristic that includes a cutoff frequency determined by the sum of the center frequency and the relative center frequency to thereby implement a time-variant filter frequency characteristic having a cutoff frequency which changes about the center frequency over the lapse of time; and a digital controlled filter circuit that performs a filter operation on a musical tone signal inputted thereto in accordance with the filter characteristic determined by the filter characteristic adder.

12. A filtering apparatus for an electronic musical instrument according to claim 11, wherein the relative center frequency of the filter characteristic is also controlled as a function of the inputted keycode signal.

13. A filtering apparatus for an electronic musical instrument according to claim 12, wherein the filter characteristic adder sets the cutoff frequency of the filter characteristic with respect to each of a plurality of keycode values.

14. A filtering apparatus for an electronic musical instrument according to claim 11, wherein the digital controlled filter circuit includes a multi-stage digital controlled filter.

15. A filtering apparatus for an electronic musical instrument in accordance with claim 11, wherein the center frequency and the relative center frequency of the filter characteristic is key scaled by designating control points that correspond to keycodes and which are interpolated to provide filter parameters.

16. A filtering apparatus for an electronic musical instrument, the apparatus comprising:

a digital filter using a cutoff frequency for effecting a filtering operation on an inputted musical tone signal;

a filter parameter designating circuit that designates a fundamental filtering parameter and a relative filtering parameter based on a plurality of control points corresponding to keycodes, the filter parameter designating circuit further including an adder to designate an initial center filtering parameter that is the sum of the fundamental filtering parameter and the relative filtering parameter, wherein the designated initial center filtering parameter is maintained throughout a duration of the musical tone signal and is used to change a filtering characteristic of the digital filter over a lapse of time;

a center parameter varying circuit for changing the relative filtering parameter in accordance with an inputted keycode signal representing a tone pitch of the musical tone signal, wherein the center parameter varying circuit sets the plurality of control points each corresponding to keycodes to establish the relative filtering parameter with respect to the inputted keycode signal, in which a relative filtering parameter corresponding to a point to be inserted between two adjacent control points is obtained by carrying out an interpolation operation with respect to the inputted keycode signal, and wherein, when said relative filtering parameter corresponds to a point which is not included between two of said control points, the relative frequency parameter is set identical to the relative filtering parameter corresponding to the nearest control point; and a cutoff frequency setting circuit for relatively and variably sets a cutoff frequency of the digital filter over the lapse of time relative to the designated initial center filtering parameter, wherein the digital filter performs the filtering operation based on the cutoff frequency.

17. A filter control apparatus comprising:

a storage device that stores level data and rate data in connection with at least one set of control points for controlling a cutoff frequency which is varied over a lapse of time, wherein each of the level data represents a relative frequency with respect to the cutoff frequency between two of the at least one set of control points, and wherein each of the rate data is provided to control a rate of variation of the cutoff frequency between the two of the at least one set of control points;

a CPU that varies the cutoff frequency from a first cutoff frequency corresponding to one of the two of the at least one set of control points to a second cutoff frequency corresponding to the other of the two of the at least one set of control points at the rate of variation, and wherein the second cutoff frequency is equivalent to a sum of the first cutoff frequency and one of the level data which corresponds to the other of the two of the at least one set of control points;

a tone-pitch designating circuit that designates a tone pitch of a sound to be produced;

a control circuit that scales the rate of variation in accordance with the tone pitch designated by the tone-pitch designating circuit; and a filter circuit that uses the cutoff frequency for effecting a filtering operation on a musical tone signal inputted thereto.

18. A filter control apparatus according to claim 17, wherein the control circuit receives decision information from the storage device representative of a decision as to whether to scale the rate of variation, so that the rate-key scaling is performed in accordance with the decision information.

19. A filter control apparatus according to claim 18, wherein the decision information is used to interpolate between a pair of the control points among the at least one set of control points when the tone pitch is between the pair of control points and to maintain a value determined from a nearest control point from among the at least one set of control points when the tone pitch is outside the at least one set of control points.

20. A filter control apparatus according to claim 17, wherein the level data and the rate data are set by a performer.

*21. A filtering apparatus for an electronic musical apparatus, comprising:*

*means for filtering a musical tone, wherein a frequency characteristic of said filtering means is controlled by a cutoff frequency;*

*means for receiving a musical parameter which can vary over a predetermined range;*

*means for storing a plurality of frequency values corresponding to a plurality of control points in said range; and*

*means for generating said cutoff frequency corresponding to said musical parameter based on said frequency values stored in said storage means, by carrying out an interpolation operation of said frequency value with respect to said musical parameter when said musical parameter takes a value between two adjacent control points, and by holding said frequency value to the nearest control point from said musical parameter when the value of said musical parameter is not located between two control points.*

*22. A filtering apparatus for an electronic musical apparatus, comprising:*

*means for filtering a musical tone, wherein a frequency characteristic of said filtering means is controlled by a cutoff frequency;*

*means for receiving a musical parameter;*

*means for generating a center frequency value, which represents a base position of said cutoff frequency, based on said musical parameter;*

*a first means for storing said center frequency value;*

*a second means for storing a plurality of relative frequency values, each of which represents a relative frequency compared to said center frequency value of each time position over time; and*

*means for adding each of said relative frequency values stored in said second storing means and said center frequency value stored in said first storing means and for producing said cutoff frequency which varies over time, based on the results of the addition.*

*23. The filtering apparatus of claim 22, further comprising a third means for storing a plurality of rate values corresponding to said plurality of relative frequency values, each of said rate values represent a variation rate of said cutoff frequency toward the corresponding relative frequency value.*

*24. The filtering apparatus of claim 22, wherein said receiving means further receives an ON signal, said ON signal triggers the generation of said musical tone and said adding and producing means further starts the generation of said cutoff frequency in response to said ON signal.*

*25. The filtering apparatus of claim 22, wherein said receiving means further receives an OFF signal, said OFF signal triggers the release state of said musical tone and said adding and producing means further starts the release state of said cutoff frequency in response to said OFF signal.*

*26. A filtering apparatus for an electronic musical apparatus, comprising:*

*means for filtering a musical tone, wherein a frequency characteristic of said filtering means is controlled by a cutoff frequency;*

*means for receiving a musical parameter;*

*means for generating a center frequency value, which represents a base position of said cutoff frequency, based on said musical parameter;*

*a first means for storing said center frequency value;*

*a second means for storing a plurality of relative frequency values corresponding to a plurality of points over time, each of which represents a relative frequency compared to said center frequency value of each of said points;*

*a third means for storing a plurality of rate values corresponding to said plurality of points, wherein each of said rate values represents a variation rate of said cutoff frequency toward the corresponding relative frequency value; and*

*means for adding each of said relative frequency values stored in said second storing means and said center frequency value stored in said first storing means and for producing said cutoff frequency which varies, through said points, at a rate corresponding to said rate value toward the results of the addition.*

*27. A filtering apparatus for an electronic musical instrument, comprising:*

*means for storing a plurality of parameters that define time-related variations of an envelope having a plurality of sections being arranged over time;*

*means for designating a section of the envelope in which key scaling is being effected on the envelope;*

*means for generating pitch information in response to a tone-generation instruction;*

*means for modifying the parameters with respect to the section of the envelope that is designated; and*

*means for generating an envelope waveform based on the parameters, wherein filter characteristics of a variable filter are being controlled by the envelope waveform.*

*28. A tone generating system comprising:*

*means for storing a program;*

*means coupled to said storing means for executing said program;*

*means coupled to said executing means for generating a musical tone;*

*means coupled to said executing means for filtering said musical tone, wherein a frequency characteristic of said filtering means is controlled by a cutoff frequency; wherein said executing means executes the following steps based on said program:*

*receiving musical instructions;*

*controlling said generating means and said filtering means to generate said musical tone in response to said instruction, wherein said cutoff frequency is set to a value corresponding to said musical instructions; and*

*modifying said cutoff frequency over time in the absence of receipt of instructions over a predetermined period of time.*

*29. A filtering apparatus for an electronic musical apparatus, comprising:*

*means for filtering a musical tone, wherein a frequency characteristic of said filtering means is controlled by a cutoff frequency;*

*means for receiving a musical parameter which can vary over a predetermined range;*

*means for storing a plurality of frequency values corresponding to a plurality of control points in said range; and*

*means for generating said cutoff frequency corresponding to said musical parameter based on said frequency values stored in said storage means, by carrying out an interpolation operation of said frequency value with respect to said musical parameter when said musical parameter takes a value between two adjacent control points, and by holding said frequency value to the nearest control point from said musical parameter when the value of said musical parameter is not located between two control points.*

*30. A filtering apparatus for an electronic musical apparatus, comprising:*

*a filter adapted to filter a musical tone, wherein a frequency characteristic of said filter is controlled by a cutoff frequency;*

*a receiver adapted to receive a musical parameter;*

*a processor programmed to generate a center frequency value, which represents a base position of said cutoff frequency, based on said musical parameter;*

*a first memory which stores said center frequency value;*

*a second memory which stores a plurality of relative frequency values, each of which represents a relative frequency compared to said center frequency value of each time position over time; and*

*said processor further programmed to operate as a cutoff frequency generator, the processor adding at least one of said relative frequency values stored in said second memory and said center frequency value stored in said first memory and generating said cutoff frequency which varies over time, based on the results of the addition.*

*31. The filtering apparatus of claim 30, further comprising a third memory which stores a plurality of rate values corresponding to said plurality of relative frequency values, each of said rate values represent a variation rate of said cutoff frequency toward the corresponding relative frequency value.*

*32. The filtering apparatus of claim 30, wherein said receiver is further adapted to receive an ON signal, said ON signal triggers the generation of said musical tone and said processor further programmed to start the generation of said cutoff frequency in response to said ON signal.*

*33. The filtering apparatus of claim 30, wherein said receiving is further adapted to receive an OFF signal, said OFF signal triggers the release state of said musical tone and said processor further programmed to start the release state of said cutoff frequency in response to said OFF signal.*

*34. A filtering apparatus for an electronic musical apparatus, comprising:*

*a filter adapted to filter a musical tone, wherein a frequency characteristic of said filter is controlled by a cutoff frequency;*

*a receiver adapted to receive a musical parameter;*

*a controller adapted to generate a center frequency value, which represents a base position of said cutoff frequency, based on said musical parameter;*

*a first memory which stores said center frequency value;*

*a second memory which stores a plurality of relative frequency values corresponding to a plurality of points over time, each of which represents a relative frequency compared to said center frequency value of each of said points;*

*a third means which stores a plurality of rate values corresponding to said plurality of points, wherein each of said rate values represents a variation rate of said cutoff frequency toward the corresponding relative frequency value; and*

*a cutoff generator adapted to add at least one of said relative frequency values stored in said second memory and said center frequency value stored in said first*

*memory and adapted to generate said cutoff frequency which varies, through said points, at a rate corresponding to said rate value toward the results of the addition.*

*35. A filtering apparatus for an electronic musical instrument, comprising:*

*a memory for storing a plurality of parameters that define time-related variations of an envelope having a plurality of sections being arranged over time;*

*a designator for designating a section of said envelope in which key scaling is being effected on said envelope;*

*a pitch information generator for generating pitch information in response to a tone generation instruction;*

*a modifier for modifying the parameters with respect to the section of the envelope that is designated by the designator; and*

*an envelope generator for generating an envelope waveform based on the parameters, wherein filter characteristics of a variable filter are being controlled by the envelope waveform.*

*36. A tone generating system comprising:*

*a program memory adapted to store a program;*

*a processor coupled to said program memory and adapted to execute said program;*

*a tone generator coupled to said processor and adapted to generate a musical tone;*

*a filter coupled to said processor and adapted to filter said musical tone, wherein a frequency characteristic of said filter is controlled by a cutoff frequency;*

*wherein said processor is adapted to execute the following steps based on said program:*

*receiving musical instructions;*

*controlling said tone generator and said filter to generate said musical tone in response to said instruction wherein said cutoff frequency is set to a value corresponding to said musical instruction; and*

*modifying said cutoff frequency over time when said instruction is not received by the receiving step.*

*37. A method of filtering a musical tone, comprising the steps of:*

*preparing a filter operable for filtering a musical tone, wherein a frequency characteristic of said filter is controlled by a cutoff frequency;*

*providing a musical parameter which can vary over a predetermined range;*

*storing a plurality of frequency values corresponding to a plurality of control points in said range; and*

*generating said cutoff frequency corresponding to said musical parameter based on said frequency values stored in said storage means, by carrying out an interpolation operation of said frequency value with respect to said musical parameter when said musical parameter takes a value between two adjacent control points, and by holding said frequency value to the nearest control point from said musical parameter when the value of said musical parameter is not located between two control points.*

*38. A method of filtering a musical tone, comprising the steps of:*

*preparing a filter operable for filtering a musical tone, wherein a frequency characteristic of said filter is controlled by a cutoff frequency;*

*providing a musical parameter;*

*generating a center frequency value, which represents a base position of said cutoff frequency, based on said musical parameter;*

*storing said center frequency value and a plurality of relative frequency values, each of which represents a relative frequency compared to said center frequency value of each time position over time;*

*adding each of said relative frequency values and said center frequency value stored in said storing step; and*

*producing said cutoff frequency which varies over time, based on the results of the addition.*

*39. The method of claim 38, wherein said storing step further comprises the step of storing a plurality of rate values corresponding to said plurality of relative frequency values, each of said rate values represent a variation rate of said cutoff frequency toward the corresponding relative frequency value.*

*40. The method of claim 38, wherein said providing step further comprises the step of providing an ON signal, said ON signal triggers the generation of said musical tone and said producing step further comprises the step of starting the generation of said cutoff frequency in response to said ON signal.*

*41. The method of claim 38, wherein said providing step further comprises the step of providing an OFF signal, said OFF signal triggers the release state of said musical tone and said producing step further comprises the step of starting the release state of said cutoff frequency in response to said OFF signal.*

*42. A method of filtering a musical tone, comprising the steps of:*

*preparing a filter operable for filtering a musical tone, wherein a frequency characteristic of said filter is controlled by a cutoff frequency;*

*providing a musical parameter;*

*generating a center frequency value, which represents a base position of said cutoff frequency, based on said musical parameter;*

*storing said center frequency value and a plurality of relative frequency values corresponding to a plurality of points over time, each of which represents a relative frequency compared to said center frequency value of each of said points and also storing a plurality of rate values corresponding to said plurality of points, wherein each of said rate values represents a variation rate of said cutoff frequency toward the corresponding relative frequency value;*

*adding each of said relative frequency values and said center frequency value stored in said storing step; and*

*producing said cutoff frequency which varies, through said points, at a rate corresponding to said rate value toward the results of the addition.*

*43. A method of filtering a musical tone, comprising the steps of:*

*storing a plurality of parameters that define time-related variations of an envelope having a plurality of sections being arranged over time;*

*designating a section of the envelope in which key scaling is being effected on the envelope;*

*generating pitch information in response to a tone-generation instruction;*

*modifying the parameters with respect to the section of the envelope that is designated; and*

*generating an envelope waveform based on the parameters, wherein filter characteristics of a variable filter are being controlled by the envelope waveform.*

*44. A method of generating a musical sound, comprising the steps of:*

*preparing a processor operable for executing program commands;*

*preparing a tone generator operable for generating a musical tone;*

*preparing a filter operable for filtering said musical tone, wherein a frequency characteristic of said filter is controlled by a cutoff frequency;*

*wherein said processor executes the following steps based on said program commands:*

*receiving musical instructions;*

*controlling said tone generator and said filter to generate said musical tone in response to said instructions wherein said cutoff frequency is set to a value corresponding to said musical instructions; and*

*modifying said cutoff frequency over time in the absence of receipt of instructions over a predetermined period of time.*

*45. A machine-readable medium containing program instructions executable by a processor for generating a tone, said program instructions causing said processor to perform the steps of:*

*preparing a filter operable for filtering a musical tone, wherein a frequency characteristic of said filter is controlled by a cutoff frequency;*

*providing a musical parameter which can vary over a predetermined range;*

*storing a plurality of frequency values corresponding to a plurality of control points in said range; and*

*generating said cutoff frequency corresponding to said musical parameter based on said frequency values stored in said storing step, by carrying out an interpolation operation of said frequency value with respect to said musical parameter when said musical parameter takes a value between two adjacent control points, and by holding said frequency value to the nearest control point from said musical parameter when the value of said musical parameter is not located between two control points.*

*46. A machine-readable medium containing program instructions executable by a processor for generating a tone, said program instructions causing said processor to perform he steps of:*

*preparing a filter operable for filtering a musical tone, wherein a frequency characteristic of said filter is controlled by a cutoff frequency;*

*providing a musical parameter;*

*generating a center frequency value, which represents a base position of said cutoff frequency, based on said musical parameter;*

*storing said center frequency value and a plurality of relative frequency values, each of which represents a relative frequency compared to said center frequency value of each time position over time;*

*adding each of said relative frequency values and said center frequency value stored in said storing step; and*

*producing said cutoff frequency which varies over time, based on the results of the addition.*

*47. The medium of claim 46, wherein said storing step further comprises the step of storing a plurality of rate values corresponding to said plurality of relative frequency values, each of said rate values represent a variation rate of said cutoff frequency toward the corresponding relative frequency value.*

*48. The method of claim 46, wherein said providing step further comprises the step of providing an ON signal, said ON signal triggers the generation of said musical tone and said producing step further comprises the step of starting the generation of said cutoff frequency in response to said ON signal.*

*49. The medium of claim 46, wherein said providing step further comprises the step of providing an OFF signal, said OFF signal triggers the release state of said musical tone and said producing step further comprises the step of starting the release state of said cutoff frequency in response to said OFF signal.*

*50. A machine-readable medium containing program instructions executable by a processor for generating a tone, said program instructions causing said processor to perform the steps of:*

*preparing a filter operable for filtering a musical tone, wherein a frequency characteristic of said filter is controlled by a cutoff frequency;*

*providing a musical parameter;*

*generating a center frequency value, which represents a base position of said cutoff frequency, based on said musical parameter;*

*storing said center frequency value and a plurality of relative frequency values corresponding to a plurality of points over time, each of which represents a relative frequency compared to said center frequency value of each of said points and also storing a plurality of rate values corresponding to said plurality of points, wherein each of said rate values represents a variation rate of said cutoff frequency toward the corresponding relative frequency value;*

*adding each of said relative frequency values and said center frequency value stored in said storing step; and*

*producing said cutoff frequency which varies, through said points, at a rate corresponding to said rate value toward the results of the addition.*

*51. A machine-readable medium containing program instructions executable by a processor for generating a tone, said program instructions causing said processor to perform the steps of:*

*storing a plurality of parameters that define time-related variations of an envelope having a plurality of sections being arranged over time;*

*designating a section of the envelope in which key scaling is being effected on the envelope;*

*generating pitch information in response to a tone-generation instruction;*

*modifying the parameters with respect to the section of the envelope that is designated; and*

*generating an envelope waveform based on the parameters, wherein filter characteristics of a variable filter are being controlled by the envelope waveform.*

*52. A machine-readable medium for use in a music apparatus having a processor for generating a musical sound according to program commands, said medium including program commands executable by said processor for causing said music apparatus to perform a method comprising the steps of:*

*preparing a tone generator operable for generating a musical tone;*

*preparing a filter operable for filtering said musical tone, wherein a frequency characteristic of said filter is controlled by a cutoff frequency;*

*receiving musical instructions;*

*controlling said tone generator and said filter to generate said musical tone in response to said instruction wherein said cutoff frequency is set to a value corresponding to said musical instruction; and*

*modifying said cutoff frequency over time when said instruction is not received by the receiving step.*

* * * * *